Patented Sept. 1, 1953

2,650,916

UNITED STATES PATENT OFFICE 2,650,916

DISAZO DYESTUFFS

Hans Ischer, Basel, Switzerland, assignor to Sandoz A. G., Basel, Switzerland, a Swiss firm No Drawing. Application July 5, 1951, Serial No. 235,363. In Switzerland July 6, 1950

6 Claims. (Cl. 260—187)

1

The present invention relates to valuable disazo dyestuffs of the type of

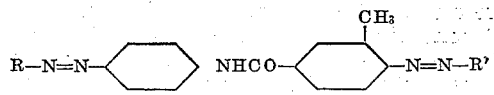

wherein R stands for the radical of a hydroxybenzoic acid and R' stands for the radical of an N-acyl derivative of an amino-hydroxy-naphthalene sulfonic acid.

An object of the present invention is the embodiment of a new group of disazo dyestuffs of the said type, which are characterized by superior properties as compared with known dyestuffs of the said type. Since the said known dyestuffs leave something to be desired from the standpoint of capacity to draw onto textile fibers, such as cotton and regenerated cellulose, it is a primary object of the invention to provide a new group of such dyestuffs which are distinguished by their outstanding capacity to draw onto the aforesaid textile fibers. This superiority is of manifest practical significance, since a poorly drawing dyestuff is correspondingly uneconomical to use.

The foregoing and other objects are realized according to the present invention by the new group of dyestuffs of the following constitution:

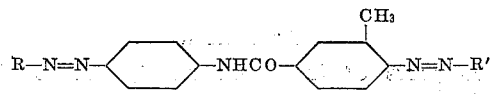

wherein R stands for the radical of 1-hydroxybenzene-2-carboxylic acid, 1-hydroxy-5-methylbenzene-2-carboxylic acid, 1-hydroxy-5-methoxy-benzene - 2 - carboxylic acid, 1-hydroxy-6-methyl-benzene-2-carboxylic acid, 1-hydroxy-6-chlorobenzene-2-carboxylic acid, 1-hydroxy-6-sulfo-benzene-2-carboxylic acid or 1-hydroxy-3-methyl-benzene-2-carboxylic acid and R' stands for the radical of an N-acyl derivative of 1-amino-5-hydroxynaphthalene - 7 - sulfonic acid, 1-amino-8-hydroxynaphthalene-4-sulfonic acid, 1-amino-8-hydroxy - naphthalene-6-sulfonic acid, 1-amino-8-hydroxynaphthalene - 3,6 - disulfonic acid, 1 - amino-8-hydroxy-naphthalene-4,6-disulfonic acid, 2-amino-5-hydroxynaphthalene-7-sulfonic acid, 2-amino-6-hydroxy-naphthalene-8-sulfonic acid, 2-amino-8-hydroxy-naphthalene-6-sulfonic acid or 2-amino-5-hydroxynaphthalene-1,7-disulfonic acid. These new dyestuffs are unexpectedly characterized by outstanding capacity for drawing onto cotton and regenerated cellulose fibers as well as by other superior properties hereinafter enumerated.

2

The aforesaid new disazo dyestuffs of the present invention are conveniently prepared by coupling the diazo compound of the aminoazo dyestuff of the formula

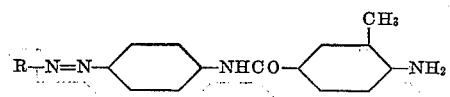

wherein R stands for the radical of 1-hydroxybenzene-2-carboxylic acid, 1-hydroxy-5-methylbenzene-2-carboxylic acid, 1-hydroxy-5-methoxy-benzene - 2 - carboxylic acid, 1-hydroxy-6-methyl-benzene-2-carboxylic acid, 1-hydroxy-6-chlorobenzene-2-carboxylic acid, 1-hydroxy-6-sulfo-benzene-2-carboxylic acid or 1-hydroxy-3-methyl-benzene-2-carboxylic acid, with an N-acyl derivative of an amino-hydroxy-naphthalene-sulfonic acid such as:

1 - amino-5-hydroxy - naphthalene - 7 - sulfonic acid,
1 - amino-8-hydroxy - naphthalene - 4 - sulfonic acid,
1 - amino - 8 - hydroxy - naphthalene-6-sulfonic acid,
1-amino-8-hydroxy - naphthalene-3,6-disulfonic acid,
1-amino-8-hydroxy - naphthalene-4,6-disulfonic acid,
2-amino - 5 - hydroxy-naphthalene - 7 - sulfonic acid,
2 - amino-6-hydroxy - naphthalene - 8 - sulfonic acid,
2-amino-8-hydroxy-naphthalene-6-sulfonic acid or
2-amino-5-hydroxy - naphthalene-1,7-disulfonic acid.

The aminoazo dyestuffs employed, as aforesaid as starting products can be prepared for example by coupling diazotized 1-amino-4-nitrobenzene with 1 - hydroxybenzene-2-carboxylic acid or a derivative thereof which couples in para position to the OH-group, reducing the nitro group in the resultant product with sodium sulfide, condensing the thus-obtained aminoazo dyestuff with 3-methyl-4-nitrobenzoyl chloride, and finally also reducing the thus-introduced nitro group with sodium sulfide.

The diazotization of the thus-prepared aminoazo dyestuff is preferably carried out indirectly, by dissolving the dyestuff in water, adding the necessary quantity of sodium nitrite, and then adjusting the solution to distinct mineral acidity by means of hydrochloric acid. The ensuing coupling of the obtained diazo compound with an acyl derivative of one of the hereinbeforeenumerated amino-hydroxy-naphthalene sulfonic acids is preferably effected in alkaline medium.

The new dyestuffs thus prepared dye cotton and regenerated cellulose in scarlet-red to blue-red shades which, upon aftertreatment with copper salts, become fast to washing and to light. In so far as any of the new dyestuffs contains an external free amino group, it can be further diazotized on the fiber and coupled with 2-hydroxy-naphthalene, producing red dyeings of very good fastness to washing and capable of being discharged to pure white.

The following examples set forth representative exemplary embodiments of the invention, and these examples are intended to be solely illustrative and not at all limitative. In these examples, the parts are by weight and the temperatures are expressed in degrees centigrade. The term "soda" refers to sodium carbonate.

*Example 1*

39 parts of the aminoazo dyestuff of the formula

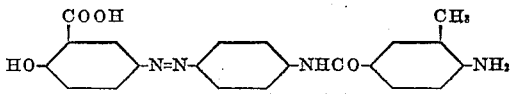

are dissolved in 500 parts of water and 10 parts of concentrated aqueous caustic soda solution. To the resultant solution, there are then added successively, at 10°, 7 parts of sodium nitrite and 40 parts of concentrated sulfuric acid. The thus-obtained suspension is stirred for 1 to 2 hours at 10° until the diazotization is completed. The diazo compound is then run into a solution of 39 parts of 2-carbethoxyamino-5-hydroxy-naphthalene-1,7-disulfonic acid and 50 parts of calcined soda in 400 parts of water. Coupling takes place very rapidly and, after stirring for 2 hours, the precipitated dyestuff is filtered off and dried at 90° under reduced pressure.

The new dyestuff, a red-brown powder, dissolves in water with red coloration and dyes cotton and regenerated cellulose in scarlet-red shades which are rendered fast to washing and to light by aftercoppering.

*Example 2*

40.5 parts of the aminoazo dyestuff of the formula

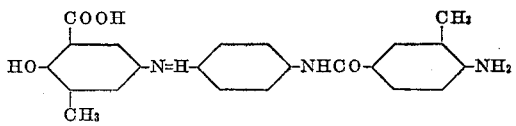

are dissolved in 500 parts of water and 10 parts of concentrated aqueous caustic soda solution. 7 parts of sodium nitrite and 40 parts of concentrated hydrochloric acid are then successively added at 10°. The reaction mixture is stirred until, after about 2 hours, the diazotization is complete, whereupon it is combined with a solution of 35.8 parts of 2-(4'-aminobenzoyl)-amino-8-hydroxynaphthalene-6-sulfonic acid and 50 parts of calcined soda in 400 parts of water. Coupling takes place very rapidly, and the precipitated dyestuff is filtered off and dried at 90° under reduced pressure.

The new dyestuff, a brown powder, dissolves in water with blue-red coloration and dyes cotton and regenerated cellulose in blue-red shades which are rendered very fast to washing and to light by aftercoppering.

The thus-prepared dyestuff can be further diazotized on the fiber and coupled with 2-hydroxy-naphthalene to produce bluish-red dyeings which are fast to washing and which can be discharged to pure whiteness.

*Example 3*

39 parts of the aminoazo dyestuff of the formula

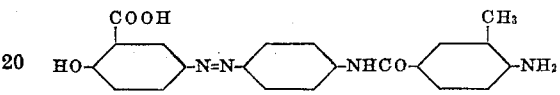

are dissolved in 500 parts of water and 10 parts of concentrated aqueous caustic soda solution. To the thus-obtained solution, there are then successively added 7 parts of sodium nitrite and 40 parts of concentrated hydrochloric acid at 10°. The resultant suspension is stirred for 1 to 2 hours at 10° until the diazotization is complete. The diazo compound is then run into a solution of 34.3 parts of 2-benzoylamino-5-hydroxy-naphthalene-7-sulfonic acid and 50 parts of calcined soda in 400 parts of water. Coupling takes place very rapidly and, after stirring for 2 hours, the precipitated dyestuff is filtered off and dried at 90° under reduced pressure.

The new dyestuff, a red-brown powder, dissolves in water with red coloration and dyes cotton and regenerated cellulose in scarlet-red shades which become very fast to washing and to light upon being aftercoppered. The dyestuff corresponds to the following formula:

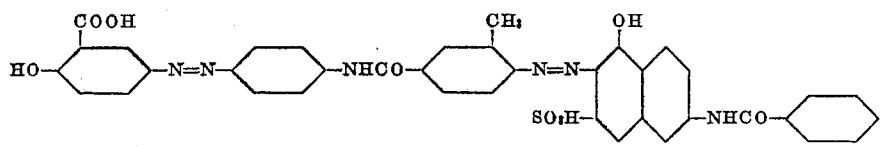

*Example 4*

39 parts of the aminoazo dyestuff of the formula

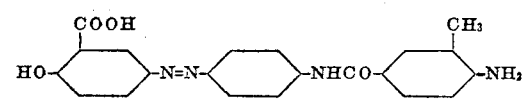

are dissolved in 500 parts of water and 10 parts of concentrated aqueous caustic soda solution. 7 parts of sodium nitrite and 40 parts of concentrated hydrochloric acid are then added successively at 10°. The resultant suspension is stirred for 1 to 2 hours at 10° until the diazotization is complete. The diazo compound is then run into a solution of 33.9 parts of 2-carbethoxy-amino-5-hydroxy-naphthalene-7-sulfonic acid and 50 parts of calcined soda in 400 parts of water. Coupling takes place very rapidly and, after stirring for 2 hours, the precipitated dyestuff is filtered off and dried at 90° under reduced pressure.

The new dyestuff, a red-brown powder, dissolves in water with red coloration and dyes cotton and regenerated cellulose in scarlet-red shades which become very fast to washing and light upon being aftercoppered. The dyestuff corresponds to the following formula:

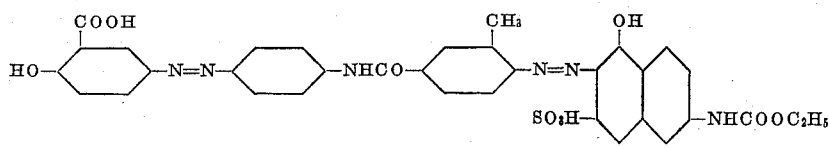

Example 5

39 parts of the aminoazo dyestuff of the formula

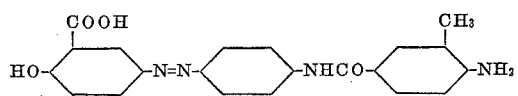

are dissolved in 500 parts of water and 10 parts of concentrated aqueous caustic soda solution. To the resultant solution, there are then successively added, at 10°, 7 parts of sodium nitrite and 40 parts of concentrated hydrochloric acid. The resultant suspension is stirred for 1 to 2 hours at 10° until the diazotization is complete. The diazo compound is then run into a solution of 35.8 parts of 2-(4'-aminobenzoyl)-amino-5-hydroxy-naphthalene-7-sulfonic acid and 50 parts of calcined soda in 400 parts of water. Coupling takes place very rapidly and, after stirring for 2 hours, the precipitated dyestuff is filtered off and dried at 90° under reduced pressure.

The new dyestuff, a red-brown powder, dissolves in water with red coloration and dyes cotton and regenerated cellulose in scarlet-red shades which become very fast to washing and to light upon being aftercoppered. The dyestuff corresponds to the formula:

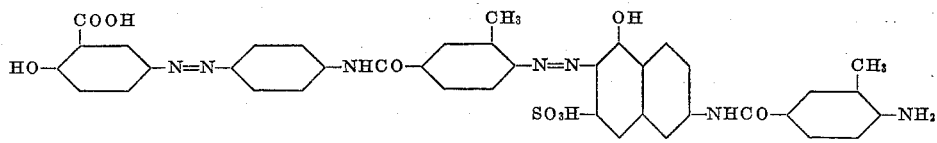

This dyestuff can be further diazotized on the fiber and coupled with 2-hydroxy-naphthalene, whereupon bluish-red dyeings are obtained which are fast to washing and which can be discharged to pure whiteness.

Example 6

39 parts of the aminoazo dyestuff of the formula:

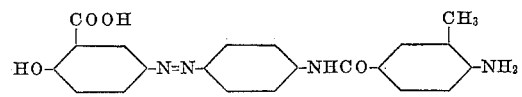

are dissolved in 500 parts of water and 10 parts of concentrated aqueous caustic soda solution. 7 parts of sodium nitrite and 40 parts of concentrated hydrochloric acid are then added successively at 10°. The resultant suspension is stirred for 1 to 2 hours at 10° until the diazotization is complete. The diazo compound is then run into a solution of 37.2 parts of 2-(3'-methyl-4'-aminobenzoyl)-amino-5-hydroxy-naphthalene-7-sulfonic acid and 50 parts of calcined soda in 400 parts of water. Coupling takes place very rapidly and, after stirring for 2 hours, the precipitated dyestuff is filtered off and dried at 90° under reduced pressure.

The new dyestuff, a red-brown powder, dissolves in water with red coloration and dyes cotton and regenerated cellulose in scarlet-red shades which become very fast to washing and to light upon being aftercoppered. The dyestuff corresponds to the formula:

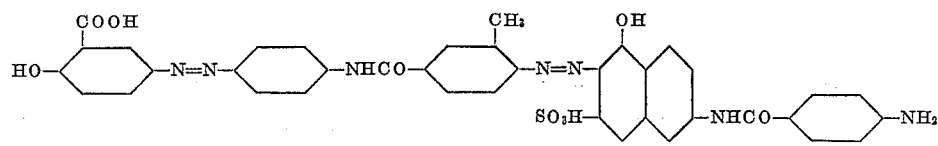

This dyestuff can be further diazotized on the fiber and coupled with 2-hydroxy-naphthalene, whereupon bluish-red dyeings are obtained which are fast to washing and can be discharged to pure whiteness.

Example 7

39 parts of the aminoazo dyestuff of the formula:

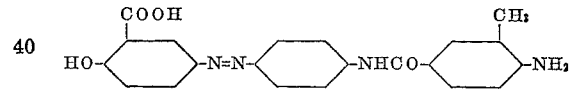

are dissolved in 500 parts of water and 10 parts of concentrated aqueous caustic soda solution. 7 parts of sodium nitrite and 40 parts of concentrated hydrochloric acid are then added successively at 10°. The resultant suspension is stirred for 1 to 2 hours at 10° until the diazotization is complete. The diazo compound is then run into a solution of 42.3 parts of 2-benzoylamino-5-hydroxy-naphthalene-1,7-disulfonic acid and 50 parts of calcined soda in 400 parts of water. Coupling takes place very rapidly and, after stirring for 2 hours, the precipitated dyestuff is filtered off and dried at 90° under reduced pressure.

The new dyestuff, a red-brown powder, dissolves in water with red coloration and dyes cotton and regenerated cellulose in scarlet-red shades which, upon aftercoppering, became very fast to washing and to light. The dyestuff corresponds to the formula:

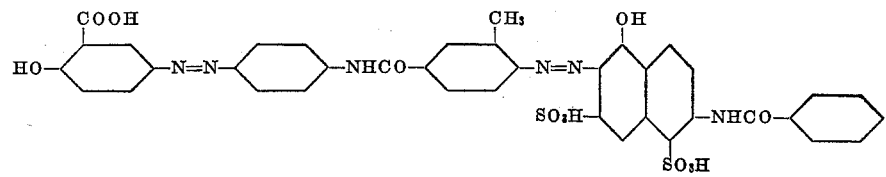

By replacing the diazo component and the coupling component of any of the foregoing examples by equivalent quantities of the diazo and coupling components enumerated in the additional examples set forth in the following table, and otherwise proceeding according to the prescriptions of the preceding examples, the corresponding additional dyestuffs are produced. These produce the indicated shades when cotton is dyed therewith, and otherwise have properties similar to those of the precedingly described dyestuffs.

In the foregoing table, the 1-hydroxybenzene-2-carboxylic acid (R) moiety may in each example be replaced by the radical of 1-hydroxy-5-methyl-benzene-2-carboxylic acid, 1-hydroxy-5-methoxy-benzene-2-carboxylic acid, 1-hydroxy-6-methyl-benzene-2-carboxylic acid, 1-hydroxy-6-chloro-benzene-2-carboxylic acid, 1-hydroxy-6-sulfo-benzene-2-carboxylic acid or 1-hydroxy-3-methyl-benzene-2-carboxylic acid, yielding in each case a dyestuff with similar properties. This means, of course, that a correspondingly substituted diazo component is employed.

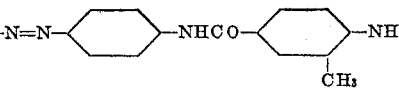

| Example No. | Diazo Component: Diazo Compound from the Aminoazo Dyestuff— R—N=N—⟨⟩—NHCO—⟨⟩(CH₃)—NH₂ wherein R is the radical of— | Coupling Component | Dyeing on Cotton |
|---|---|---|---|
| 8 | 1-hydroxybenzene-2-carboxylic acid | 2-benzoylamino-5-hydroxy-naphthalene-7-sulfonic acid | Scarlet. |
| 9 | do | 2-acetylamino-5-hydroxy-naphthalene-7-sulfonic acid | Do. |
| 10 | do | 2-cinnamoylamino-5-hydroxy-naphthalene-7-sulfonic acid | Do. |
| 11 | do | 2-(2'-carboxybenzoyl)-amino-5-hydroxy-naphthalene-7-sulfonic acid | Do. |
| 12 | do | 2-(4'-aminobenzoyl)-amino-5-hydroxy-naphthalene-7-sulfonic acid | Do. |
| 13 | do | 2-(3'-aminobenzoyl)-amino-5-hydroxy-naphthalene-7-sulfonic acid | Do. |
| 14 | do | 2-(4'-aminobenzoyl)-amino-8-hydroxy-naphthalene-6-sulfonic acid | red. |
| 15 | do | 2-(3'-aminobenzoyl)-amino-5-hydroxy-naphthalene, 1,7-disulfonic acid | scarlet. |
| 16 | do | 2-benzoylamino-8-hydroxy-naphthalene-6-sulfonic acid | red. |
| 17 | do | 1-benzoylamino-8-hydroxy-naphthalene-6-sulfonic acid | blue-red. |
| 18 | do | 1-(4'-aminobenzoyl)-amino-8-hydroxy-naphthalene-6-sulfonic acid | Do. |
| 19 | do | 1-(4'-aminobenzoyl)-amino-5-hydroxy-naphthalene-7-sulfonic acid | scarlet. |
| 20 | do | 1-(4'-aminobenzoyl)-amino-8-hydroxy-naphthalene-4,6-disulfonic acid | blue-red. |
| 21 | do | 2-(3'-methyl-4'-aminobenzoyl)-amino-8-hydroxy-naphthalene-6-sulfonic acid | Do. |
| 22 | do | 2-(4'-methyl-3'-aminobenzoyl)-amino-5-hydroxy-naphthalene-7-sulfonic acid | red. |
| 23 | do | 2-(3'-methyl-4'-aminobenzoyl)-amino-5-hydroxy-naphthalene-7-sulfonic acid | Do. |
| 24 | do | 2-(3'-methyl-4'-aminobenzoyl)-amino-5-hydroxy-naphthalene-1,7-disulfonic acid | Do. |
| 25 | do | 1-(3'-methyl-4'-aminobenzoyl)-amino-5-hydroxy-naphthalene-7-sulfonic acid | Do. |
| 26 | do | 2-(4'-benzoylaminobenzoyl)-amino-5-hydroxy-naphthalene-1,7-disulfonic acid | scarlet. |
| 27 | do | 1-(4'-benzoylaminobenzoyl)-amino-8-hydroxy-naphthalene-4,6-disulfonic acid | blue-red. |
| 28 | do | 2-carbethoxyamino-5-hydroxy-naphthalene-7-sulfonic acid | scarlet. |
| 29 | do | 2-benzoylamino-5-hydroxy-naphthalene-1,7-disulfonic acid | Do. |
| 30 | do | 2-cinnamoylamino-8-hydroxy-naphthalene-6-sulfonic acid | red. |
| 31 | do | 2-acetylamino-6-hydroxy-naphthalene-8-sulfonic acid | blue-red. |
| 32 | do | 1-(4'-aminobenzoyl)-amino-8-hydroxy-naphthalene-4-sulfonic acid | Do. |
| 33 | do | 1-benzoylamino-8-hydroxy-naphthalene-3,6-disulfonic acid | Do. |

The following are formulae of representative products of the foregoing Examples 8 to 33:

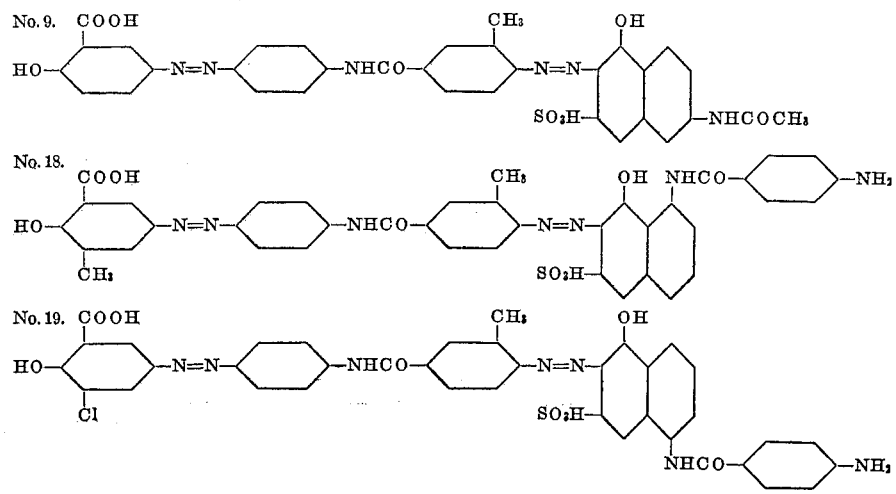

No. 27.
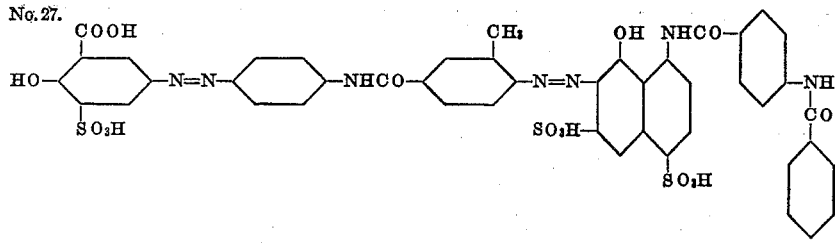

No. 29.
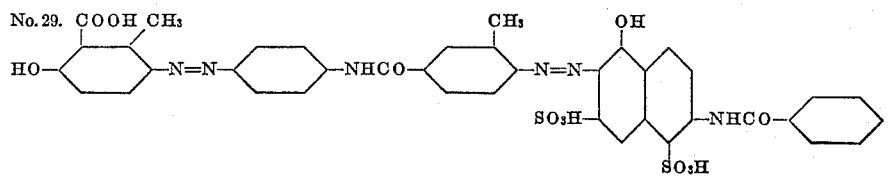

No. 30.
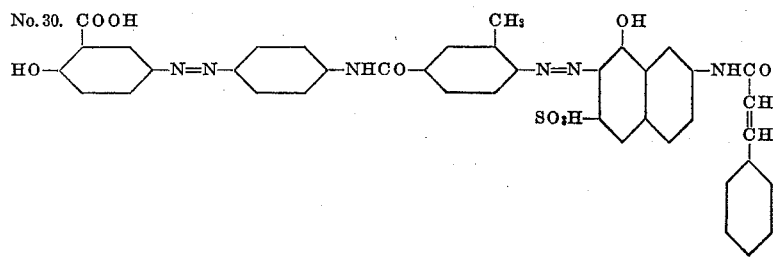

No. 31.
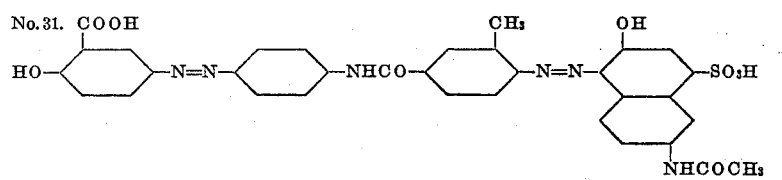

No. 32.
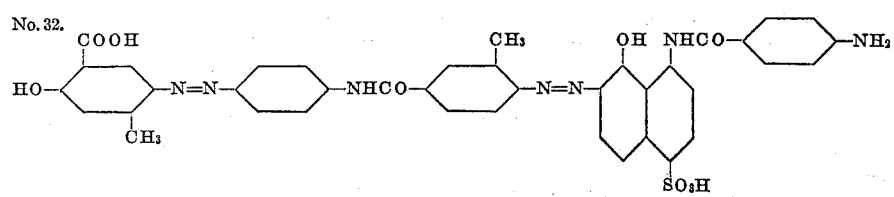

No. 33.
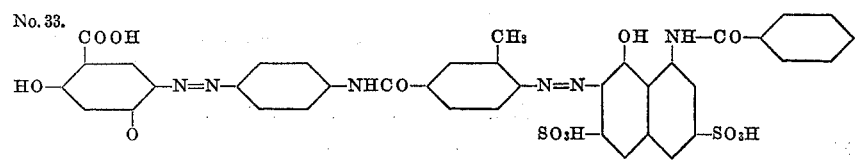

*Example 34*

Dyeing with a representative dyestuff according to the present invention may be carried out for example as follows:

100 parts of vegetable textile material, for instance cotton, are entered at 20° C. into a neutral bath containing 10 parts of Glauber's salt and 1 part of the dyestuff corresponding to the following formula

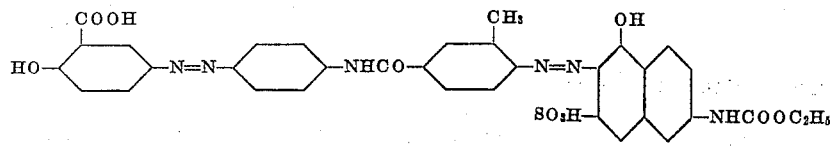

corresponding to Example 4. Then the dye bath is heated within a period of 30 minutes to its boiling temperature and boiling continued for 15 minutes. After cooling down to 40° C. the material is taken off and rinsed in cold water. The thus obtained direct dyeing of scarlet red shade shows a very good fastness to light and to washing.

For after-treatment with a copper salt the direct dyed material is treated for 20 minutes at a temperature of 60° to 70° C. in a bath containing 2 parts of copper sulfate and 3 parts of acetic acid 30% whereupon the material is washed off with cold water, squeezed and dried.

The after-coppered dyeing, the shade of which being not very much different from that of the direct dyeing, shows very good fastness to light and an excellent fastness to washing.

*Example 35*

The dyestuffs according to the present invention may also be diazotized and developed on the fiber insofar as the dyestuffs contain a free amino group. The dyeing method may be carried out in the following way:

100 parts of cotton being direct dyed in the above described manner with 1 part of the dyestuff of the formula

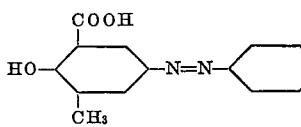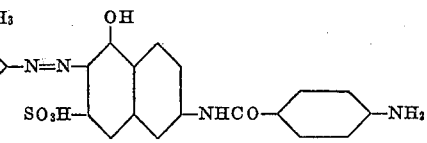

are immersed for 30 minutes in a cold bath containing 2 parts of sodium nitrite and 3 parts of sulfuric acid 66° Bé. During the diazotizing operation the dyed textile material is to be protected against sun-light. After rinsing for a short time in slightly acidified cold water, the material is entered into a cold development bath containing 1 part of 2-hydroxynaphthalene and 1 part of sodium hydrate of 40° Bé. After treatment for 20 to 30 minutes in this bath the material is taken off, thoroughly washed with cold water and dried.

The thus obtained red dyeing is distinguished by an excellent fastness to washing and especially by good dischargeability, both with a neutral and an alkaline discharge paste.

Having thus disclosed the invention, what is claimed is:

1. A disazo dyestuff corresponding to the formula

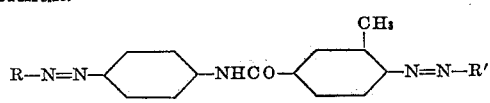

wherein R stands for the radical of a 1-hydroxy-benzene-2-carboxylic acid selected from the group consisting of 1-hydroxybenzene-2-carboxylic acid, 1 - hydroxy-5-methylbenzene-2-carboxylic acid and 1-hydroxy-3-methyl-benzene-2-carboxylic acid and wherein R' stands for an N-acylated radical of an amino-hydroxy-naphthalene sulfonic acid selected from the group consisting of 1-amino-5-hydroxy-naphthalene-7-sulfonic acid, 1-amino-8-hydroxy-naphthalene-4-sulfonic acid, 1 - amino-8-hydroxy-naphthalene-6-sulfonic acid, 1-amino-8-hydroxy - naphthalene - 3,6 - disulfonic acid, 1-amino - 8 - hydroxy-naphthalene-4,6-disulfonic acid, 2 - amino-5-hydroxy-naphthalene-7-sulfonic acid, 2-amino-6-hydroxy-naphthalene-8-sulfonic acid, 2-amino-8-hydroxy-naphthalene-6-sulfonic acid and 2-amino-5-hydroxy-naphthalene-1,7-disulfonic acid.

2. The disazo dyestuff of the formula

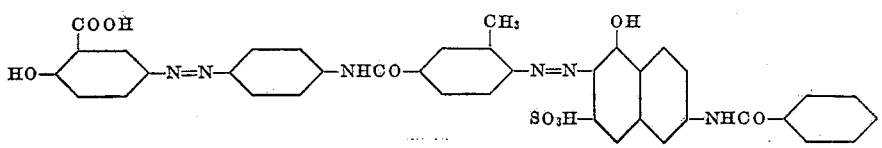

3. The disazo dyestuff of the formula

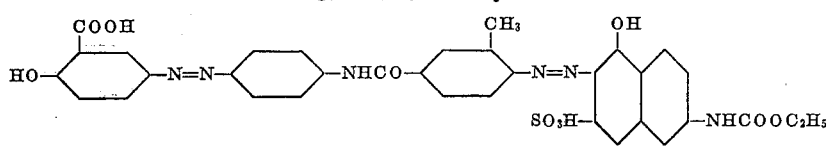

4. The disazo dyestuff of the formula

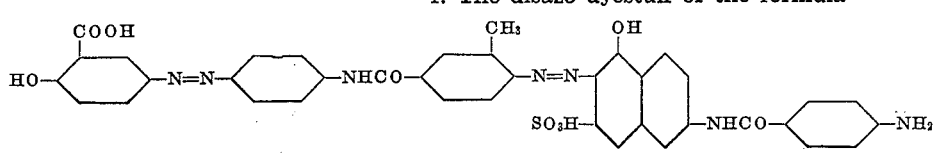

5. The disazo dyestuff of the formula

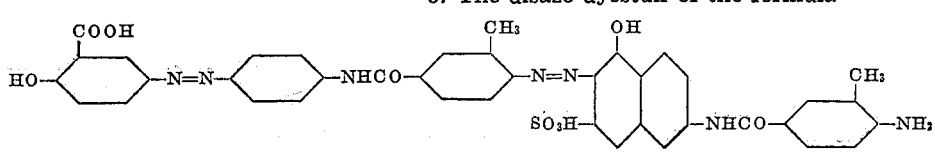

6. The disazo dyestuff of the formula

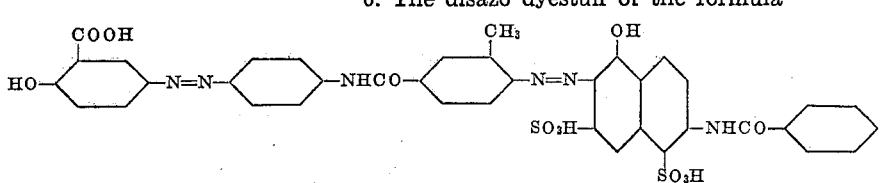

HANS ISCHER.

References Cited in the file of this patent

UNITED STATES PATENTS

| Number | Name | Date |
|---|---|---|
| 1,663,950 | Neelmeier et al. | Mar. 27, 1928 |
| 2,228,321 | Messmer | Jan. 14, 1941 |
| 2,458,776 | Grandjean | Jan. 11, 1949 |